United States Patent [19]

Toronto et al.

[11] Patent Number: 5,551,718
[45] Date of Patent: Sep. 3, 1996

[54] PEDAL MECHANISM FOR CYCLE AND EXERCISE EQUIPMENT

[76] Inventors: Salvatore Toronto, 3995 Hortensia St., Ste. G-1, San Diego, Calif. 92109; Paul Novak, 1617 Brookes Ave. #6, San Diego, Calif. 92103

[21] Appl. No.: 191,586

[22] Filed: Feb. 4, 1994

[51] Int. Cl.$^6$ ................................................ B62M 1/04
[52] U.S. Cl. ........................ 280/252; 280/253; 280/258
[58] Field of Search ............................... 280/252, 253, 280/256, 257, 258, 259

[56] References Cited

U.S. PATENT DOCUMENTS

| | | | |
|---|---|---|---|
| 2,286,154 | 6/1942 | Norred | 280/258 |
| 5,105,688 | 4/1992 | Williams . | |
| 5,163,886 | 11/1992 | Seol . | |

FOREIGN PATENT DOCUMENTS

| | | | |
|---|---|---|---|
| 127260 | 4/1948 | Australia | 280/253 |
| 680723 | 10/1992 | Switzerland | 280/253 |
| 2065576 | 7/1981 | United Kingdom | 280/252 |
| 2219261 | 12/1989 | United Kingdom | 280/253 |

*Primary Examiner*—Mitchell J. Hill
*Attorney, Agent, or Firm*—Lane, Aitken & McCann

[57] ABSTRACT

A bicycle mechanism to permit a forward force to be applied to the bicycle's drive wheel by backward rotation of the bicycle's pedals in addition to permitting a forward force to be applied to the drive wheel by a forward rotation of said pedals. A preferred embodiment allows one of the pedals to be rotated in one direction while the other pedal rotates in the opposite direction.

28 Claims, 6 Drawing Sheets

PEDAL MECHANISM FOR CYCLE AND EXERCISE EQUIPMENT

This invention relates to pedal powered devices and in particular to bicycles and pedal powered exercise equipment.

BACKGROUND OF THE INVENTION

Bicycle riding is excellent exercise. Vigorous biking is wonderful for general body health in that it produces increased heart pumping to supply increased blood to the large leg muscles. There is not the constant leg impact associated with jogging.

In the basic bicycle design, a chain sprocket on the rear wheel of the bicycle is driven by a bicycle chain through a chain sprocket powered by a pedal shaft driven by the legs and feet of the bicyclist operating on a pair of bicycle pedals attached to the pedal shaft.

For the typical bicycle to move in the forward direction, the bicyclist applies force to the pedals causing them to rotate in the same rotational direction as the wheels of the bicycle for forward motion. (This rotational direction is hereinafter referred to as the "forward direction". The reverse direction is hereinafter referred to as the "reverse direction". In some cases we will refer to rotational direction of various parts of the bicycle as either clockwise or counter-clockwise. In such cases it will be assumed that we are viewing the bicycle from its right side, and in all of the figures we will be viewing the bicycle and the bicycle parts from the right side.) Typical bicycles in use today do not operate in reverse. For these bicycles the pedals can be rotated in the counter-clockwise direction when the bicycle is moving forward, but such motion provides no force to the wheels of the bicycle. Thus, with prior art bicycles, force can be applied to the wheels of the bicycle only by rotating the pedals in the forward direction. Normally force is applied to the rear wheel only on the downward stroke of the pedals; however it is fairly common practice for bicyclists to clamp their shoes to the pedals. Then force can also be applied to the rear wheel on the upward stroke of the pedals.

With prior art bicycles there is no way to apply forward force to the wheels of the bicycle with a reverse motion of the pedals. Such an improvement would increase the value of the bicycle as an exercise device and also provides an alternate method of propulsion emphasizing use of different leg and related muscles which would increase endurance for long bike trips.

What is needed is a bicycle mechanism which will permit the bicyclists to apply forward driving force to the wheels of the bicycle with both forward and reverse motion of the pedals to obtain these performance enhancements.

SUMMARY OF THE INVENTION

The present invention provides a bicycle attachment to permit a forward force to be applied to the bicycle's drive wheel by reverse rotation of the bicycle's pedals in addition to permitting a forward force to be applied to the back wheel by a forward rotation of said pedals. A preferred embodiment allows the pedals to be rotated in opposite directions.

The present invention is well suited to provide a wide range of exercise routines for the user in order to tone thighs, hamstrings, calfs, abdominal, back and various upper front and side-body muscles. The invention provides reverse conventional pedaling, forward reciprocal pedaling, reverse reciprocal pedaling, kangaroo or pogo-stick pedaling, counter (alternating forward and backward) pedaling.

The invention is unobtrusive, barely visible from the right side of the bicycle. It is very light weight and can be easily installed on most existing bicycles or incorporated into the design of new bicycles.

DETAILED DESCRIPTION OF PREFERRED EMBODIMENTS

Forward Motion with Forward or Reverse Pedaling

Figure 1A:
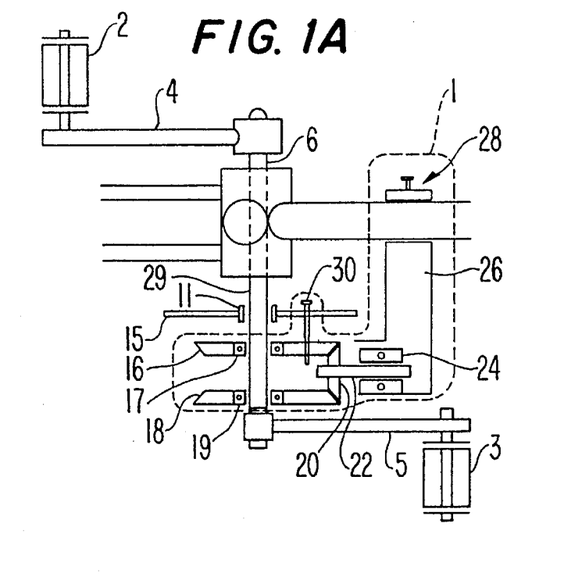
FIGS. 1A and 1B are two views showing a preferred embodiment of the present invention.
Figure 1B:
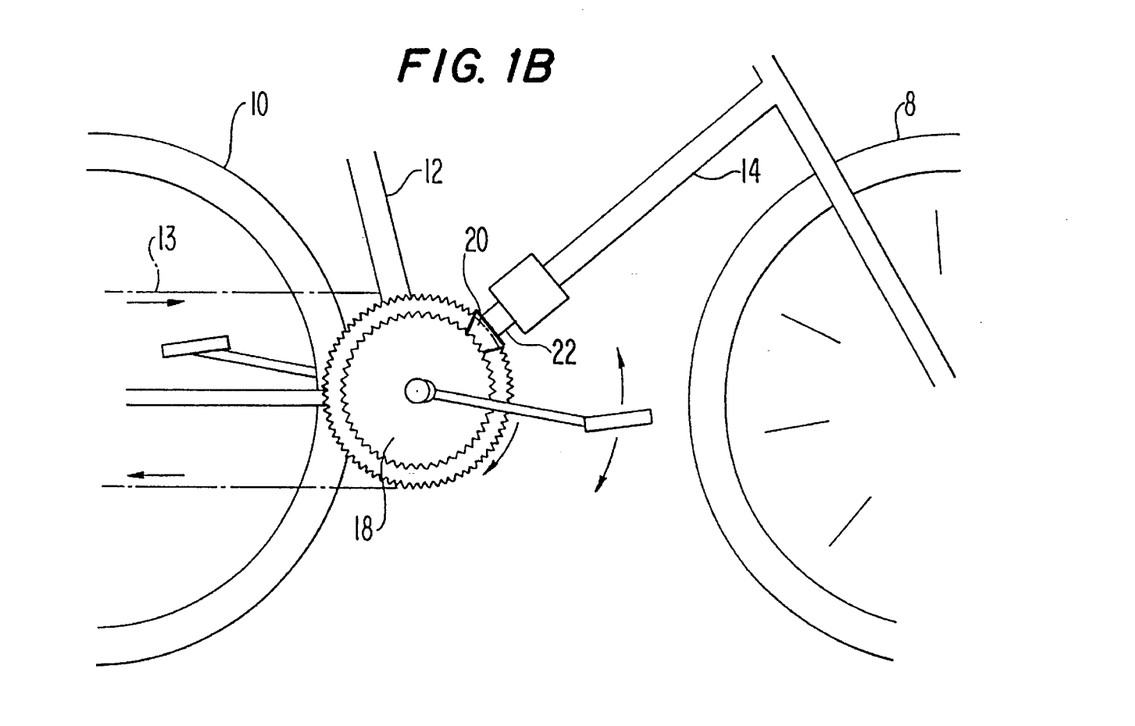

FIGS. 1A and 1B describe an embodiment of the present invention which provides for forward motion of the bicycle with either forward or reverse rotation of the pedals. This embodiment is provided by adding specified equipment to a standard bicycle. The additional equipment is depicted within the dashed line 1 on FIG. 1A. Standard bicycle parts relevant to this invention are shown in the figures are left pedal 2 and right pedal 3, pedal arms 4 and 5, pedal shaft 6, front wheel 8, drive wheel 10, seat tube 12, down tube 14, drive chain 13 and pedal sprocket 15.

In this embodiment pedal shaft 6 has been extended with an 29 so that the gear equipment shown on FIG. 1A can be added. Added parts are a first bevel gear 16, a second bevel gear 18, and a third reversing bevel gear 20. Reversing gear 20 is gear matched to gears 16 and 18 and rotates on reversing gear shaft 22 which rotates within bearings 24 mounted in frame 26 which is attached to down tube 14 by clamp 28. Gear 16 is mounted on freewheeling clutch 17 which causes gear 16 to rotate freely in the counter-clockwise direction about shaft 6 but rotate with shaft 6 in the clockwise direction. Gear 18 is mounted on freewheeling clutch 19 which causes gear 18 to rotate freely in the clockwise direction about shaft 6 but rotate with shaft 6 in the counter-clockwise direction. Gear 16 is attached to pedal sprocket 15 by fastener 30.

Both pedals are connected to the pedal shaft 6 in the normal manner but pedal sprocket 15 rotates about shaft 6 on bearing 11. Clockwise motion of the pedals causes gear 16 to rotate clockwise which causes chain sprocket 15 to rotate clockwise driving chain 13 clockwise and the bicycle forward. Gears 20 and 18 rotate freely with no significant loss of energy or total bicycle efficiency. Counter-clockwise rotation of the pedals causes gear 18 to rotate counter-clockwise which, through reversing gear 20, causes gear 16 to rotate clockwise which again causes clockwise chain sprocket 15 rotation and forward bicycle motion. Due to some small gear losses there is some reduction in total bicycle efficiency but not much. We estimate this efficiency loss in the gears to be practically imperceptible.

Thus, with this improvement the bicyclist can pedal alternatively clockwise or counter-clockwise. This variety of the pedal rotation utilizes the leg and related muscle groups in slightly different ways which increases overall endurance and makes traveling long distances easier for the bicyclist.

Gears 16 and 18 are preferably sized to fit within the diameter of the existing crankcase. Persons skilled in the art will recognize that many other gear arrangements and sizes which would work effectively. An appropriate housing for the gears should be provided using techniques well known in the art.

Kangaroo Stroke

Figure 2A:
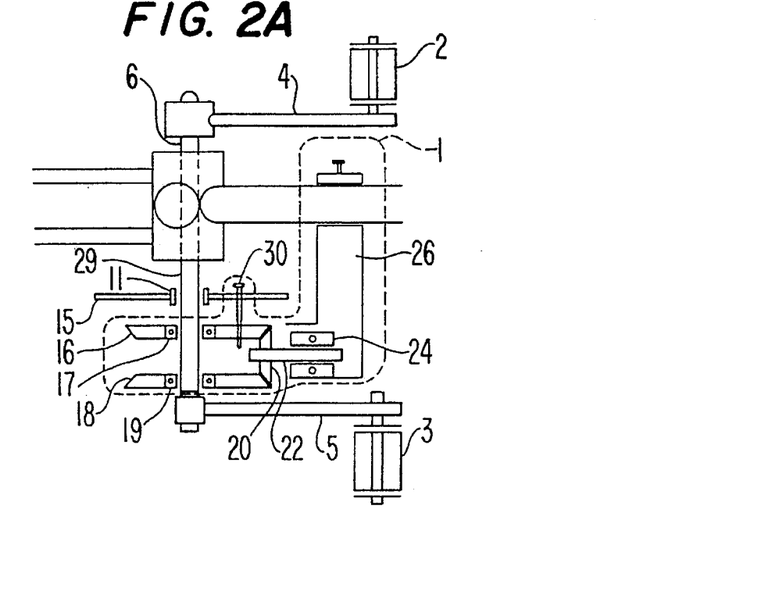
FIGS. 2A and 2B are two views showing a preferred embodiment.
Figure 2B:
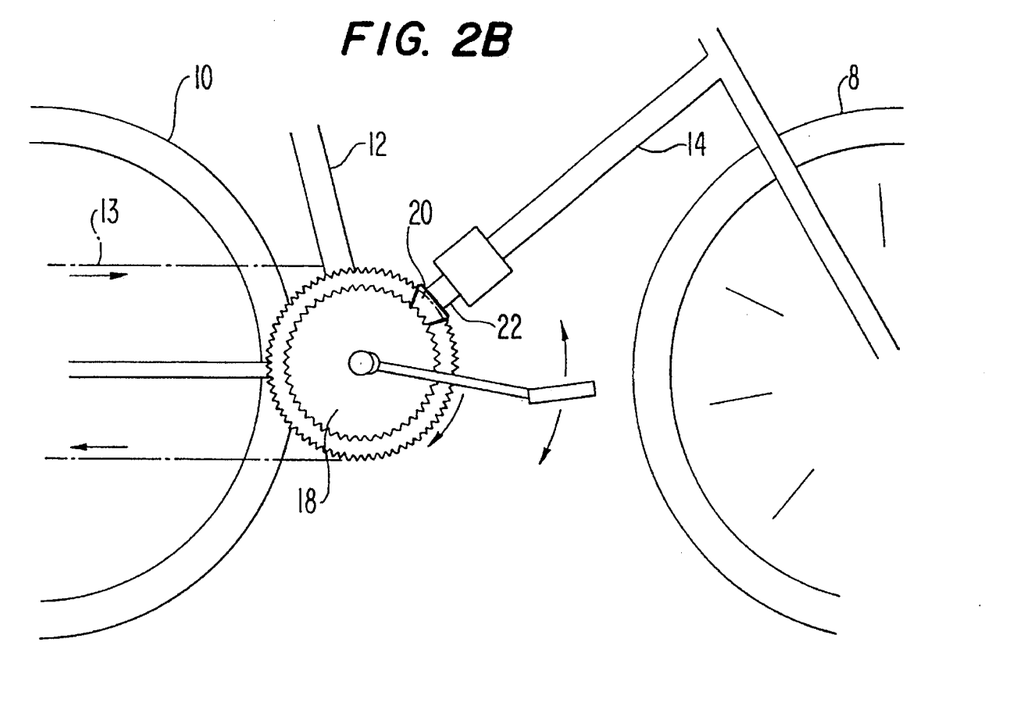

FIGS. 2A and 2B shows a slightly different embodiment using the same parts described above. This embodiment is the same as that shown in FIGS. 1A and 1B except both pedals are positioned to be parallel to each other. In this embodiment the bicyclist's shoes must be firmly attached to the pedals. Commercially available equipment can be used to clamp the shoes to the pedals. Up and down motions are used to propel the bicycle. If desired limiters can be provided at 2:00 and 4:00 o'clock.

Alternatively the limiters can be arranged in other positions to provide a great variety of back and fourth, clockwise or counter-clockwise leg motions are possible. Many of these options provide great exercise for the abdominal and gludteal and related muscles.

Stair Climbing

Figure 3A:
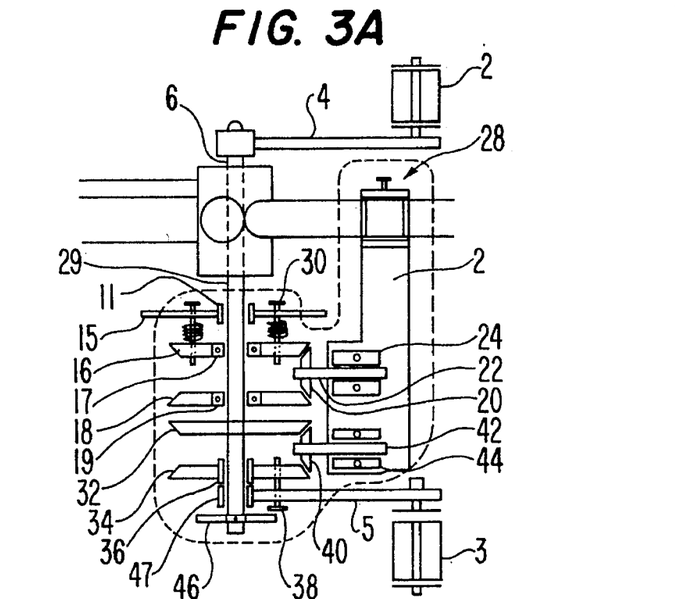
FIGS. 3A and 3B are two views showing a preferred embodiment.
Figure 3B:
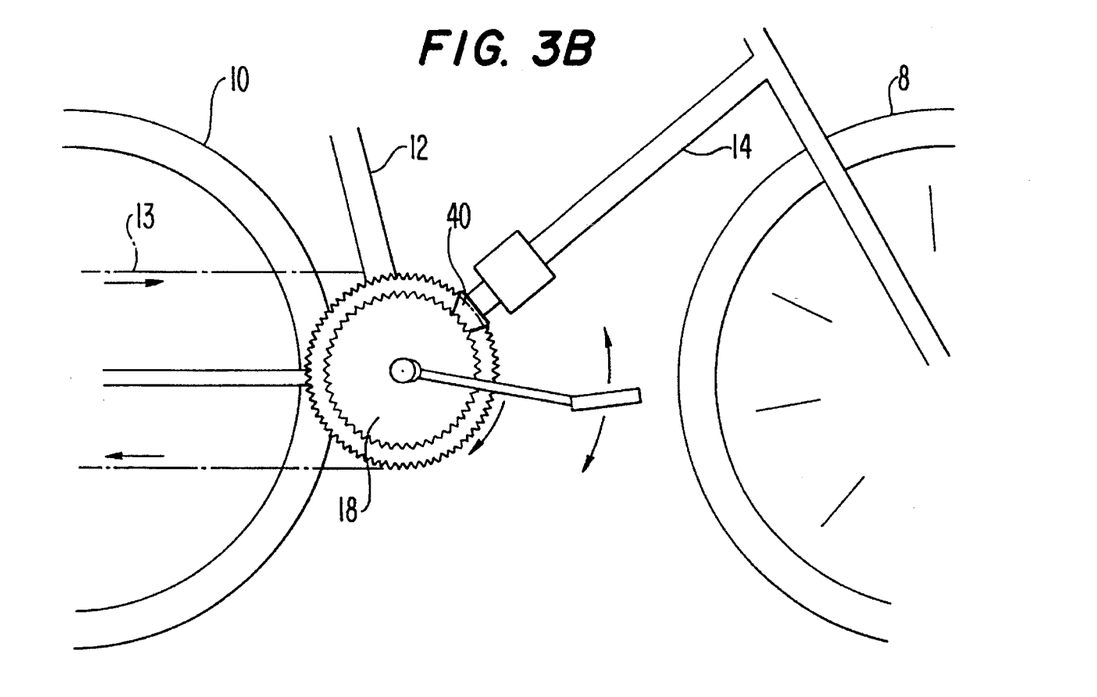

FIGS. 3A and 3B show an embodiment which provides for forward bicycle motion with the pedals reciprocally rotating in opposite directions. The alternating motions can be started from any major quadrant. This embodiment contains the parts shown in FIGS. 1A and 1B and the following additional parts: a fourth bevel gear 32, a fifth bevel gear 34 (similar to gears 16 and 18), and a sixth reversing idler gear 40. Reversing idler gear 40 is matched to gears 32 and 34 and gear 40 rotates on reversing shaft 42 which in turn rotates within bearing 44 mounted in frame 2. Gear 32 is fixedly mounted on shaft 6 and gear 34 rotates freely about shaft 6 on bearing 36. Right pedal arm 5 also rotates freely about shaft 6 on bearing 47. Because of the arrangement of gears 32 and 34, pedals 2 and 3 must of necessity rotate in opposite directions. Since gear 32 is engaged in gear 34, pedal 2 rotates in the same direction as shaft 6 and pedal 3 rotates in the direction opposite of the direction of rotation of shaft 6. For reasons explained above, reciprocating motion or rotation of either of the pedals in either direction will produce forward motion of the bicycle. This embodiment is excellent for stair climbing type of leg motion to exercise gluteal and greater hamstring muscles in addition to the other leg muscles. A limiter could also be engaged for limiting the alternating pedal movement between 7:00 and 11:00 o'clock and 1:00 to 5:00 o'clock.

Connecting the pedal arm 5 to flange 46 instead of gear 34 permits operation of the bicycle in a continuous mode as described in the two previous sections.

Exercise Bicycle

The bicycle could be mounted on a stationary exercise frame such as units marketed by Minoura and Blackburn Corporations. As a result most regular bicycles can be converted to a multiple variation exercise machine providing a very wide variety of exercise options.

Relative Pedal Positions

Persons skilled in the art will note that in all of the embodiments of the present invention discussed above, the pedals rotate at the same speed either in the same direction or different directions. In either case the relative starting positions can be important. These starting positions can be established in a wide variety of ways such as fixing the pedal arm at specific relative positions on pedal shaft 6 or on gear 34 or on flange 46.

Remote Adjustment of Pedal Position and Relative Pedal Rotation

Figure 5:
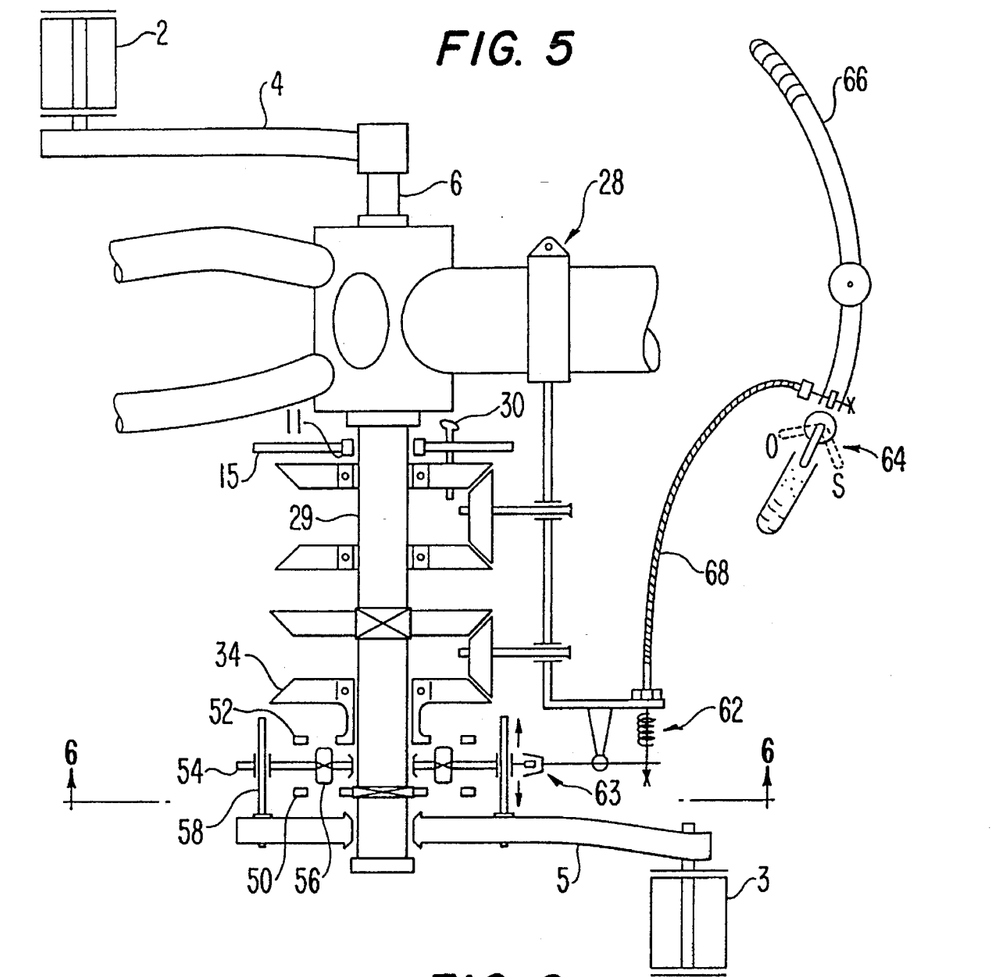
FIGS. 5 and 6 show a kinetic modes switching unit where forward or reverse pedaling and relative pedal positions are selected from the bicycle handlebar.
Figure 6:
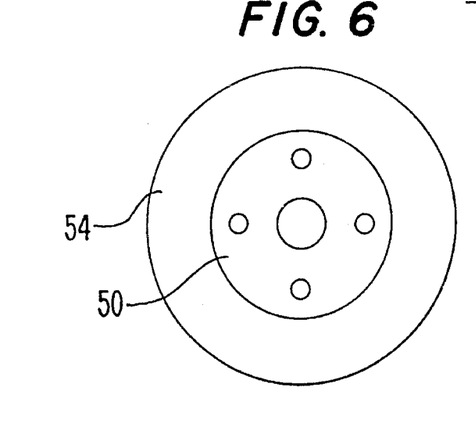

It is feasible to provide for selection of relative pedal positions and relative direction of rotation at the will of the bicyclist while riding down the road. This can be done with a clutch-cable arrangement with controls at the handlebar as is shown in FIGS. 5 and 6. As shown in FIG. 5, the basic arrangement of the pedal shaft and the gears is the same as shown in FIGS. 3A and 3B, Positional discs 50 and 52 have been added along with control disc 54 and pins 56. Positional disc 52 is attached to gear 34 and turns freely on pedal shaft 6. Positional disc 50 is permanently attached to pedal shaft 6. Pedal crank 5 rotates freely on shaft 6 and through prongs 58 is slidably coupled to control disc 54. Axial movement of the control disc 54 along the shaft 6 is caused by shifting mechanism 62 which is remotely actuated through lever 64 mounted on the handlebar 66. Boden cable 68 provides the link between actuator 64 and the shifter 62. FIG. 6 shows a side view of the positional discs 50 as well as control disc 54. Positional discs 50 and 52 have four holes equally spaced from the central axis of the pedal shaft and represent the four major quadrants. Control disc 54 has two pins 180 degrees apart matching the holes in positional discs 50 and 52. The rim of control disc 54 is held in a particular position by shifting mechanism 62 through a slidable joint 63. As the bicyclist moves shifter 64, control disc 54 is axially displaced to either side O or S. With shifter 64 at "0" engaging pins 56 engage into positional disc 52 for alternating pedaling (the right side pedal moves in the rotational direction opposite that of the left pedal and the pedal shaft), and with shifter 64 at S engaging pins engage into positional disc 50 for continuous forward or reverse pedaling (the right side pedal moves in the rotation direction in the same direction as the pedal shaft and the left pedal). While shifter 64 is in the neutral position N the pedals can be moved to any position relative to each other.

Wide Variety of Options

Figure 7:
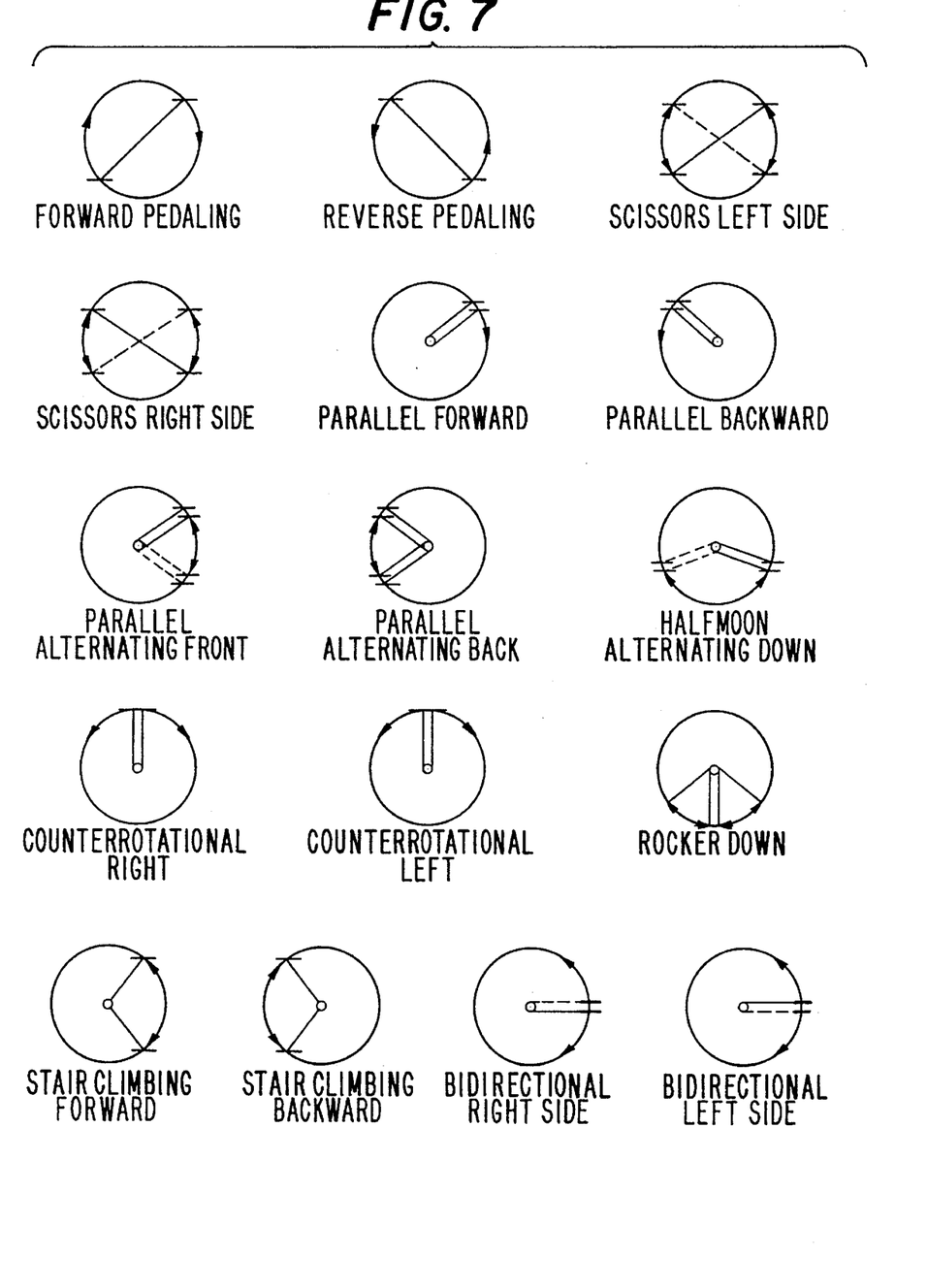
FIG. 7 shows a variety of pedaling positions.

FIG. 7 summarizes some of the wide variety of pedaling options available with this invention.

Other Gear Arrangements

Figure 4:
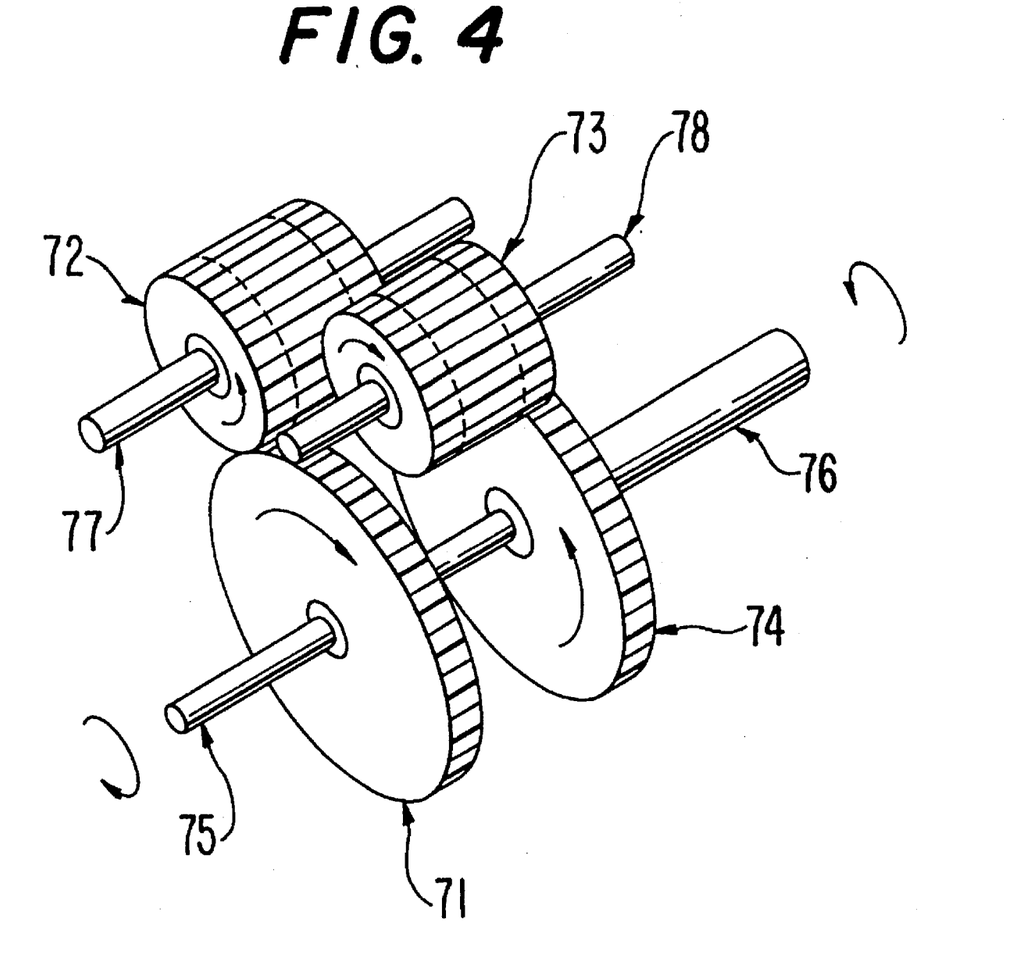
FIG. 4 shows a configuration of spur gears.

Although the present invention has been described above making use of bevel gears, persons skilled in this art will recognize that many other gear arrangement could be used with essentially equivalent results. One preferred alternative would be to use spur gears to achieve the reversing effects described above. FIG. 4 is a sketch demonstrating how the reversing effects are achieved with spur gears. Drive shaft 5 comporting gear 71 engages idler gear 72 rotating on shaft 77. Gear 72 being of an enlarged width to that of gears 71 and 74. ldlet gear 73 which rotates on shaft 78 engages idler gear 72 as well as idler gear 74. Idler gear 73 being of an enlarged width compared to gears 71 and 74. Output shaft 76 is affixed to gear 74 and is concentric to input shaft 75. Spacing between idlers and gears 71 and 74 are such that they never interlock themselves with each other, in this way achieving concentric reverse rotation between input shaft 85 and exit shaft 6. Persons skilled in the art will also recognize that these reversing effects can also be accomplished with a chain and sprocket arrangement. In fact Applicants built their first proof of principal demonstration model using a chain and sprocket unit which worked reasonably well.

While the above description contains many specificities, the reader should not construe these as limitations on the scope of the invention, but merely as exemplification's of preferred embodiments thereof. Those skilled in the art will envision many other possible variations which are within its scope. Accordingly the reader is requested to determine the scope of the invention by the appended claims and their legal equivalents, and not by the examples which have been given.

I claim:

1. A pedal mechanism for attachment to a bicycle, having pedals, a pedal shaft, a drive chain and a drive wheel, said drive wheel being caused to rotate in a clockwise direction, when viewed from the right side of said bicycle, by a clockwise force provided by rotation of said drive chain in one direction, comprising:

a gearing means for attachment to said bicycle to impart a clockwise force in said one direction to said drive chain simultaneously from both of said pedals by rotation of said pedals in a counterclockwise direction in addition to imparting a force in said one direction to said drive chain simultaneously from both of said pedals by rotation of said pedals in said clockwise direction.

2. A pedal mechanism as in claim 1 wherein said gearing means comprises at least three gears, defining a first gear, a second gear and a third gear, said first gear and said second gear being positioned to rotate about said pedal shaft in directions opposite each other.

3. A pedal mechanism as in claim 1 wherein said gearing means comprises at least three bevel gears, two of said bevel gears being positioned to rotate about said pedal shaft in directions opposite each other.

4. A pedal mechanism as in claim 1 wherein said gearing means comprises at least three spur gears, two of said spur gears being positioned to rotate about said pedal shaft in directions opposite each other.

5. A pedal mechanism as in claim 2 wherein said gearing means further comprises a pedal sprocket driving said drive chain, said pedal sprocket being configured to rotate about said pedal shaft.

6. A pedal mechanism as in claim 5 wherein said first gear is attached to said pedal sprocket so that said first gear and said pedal sprocket rotate together about said pedal shaft.

7. A pedal mechanism as in claim 6 wherein said first gear is attached to a clutch means so as to permit said first gear to rotate freely in said counterclockwise direction about said pedal shaft but rotate with and be driven by said pedal shaft in said clockwise direction.

8. A pedal mechanism as in claim 7 wherein said second gear is attached to a clutch means so as to permit said second gear to rotate freely in said clockwise direction about said pedal shaft but rotate with and be driven by said pedal shaft in said counterclockwise direction.

9. A bicycle comprising:

a pedal shaft having a first end and a second end, a first pedal arm connected to said first end of said pedal shaft, a second pedal arm connected to said second end of said pedal shaft, a first pedal connected to said first pedal arm, a second pedal connected to said second pedal arm, a drive chain, a drive wheel which is caused to rotate clockwise by a clockwise force provided by rotation of said drive chain in one direction by the clockwise rotation of said pedals, and gearing means to impart a clockwise force to said drive wheel by rotation of said drive chain in said one direction by the simultaneous rotation of said first and second pedal arms in a counterclockwise direction in addition to imparting a clockwise force to said drive wheel by rotation of said drive chain in said one direction by rotation of said first and second pedal arms in a clockwise direction.

10. A bicycle as in claim 9 wherein said gearing means comprises at least three gears, defining a first gear, a second gear and a third gear, said third gear connected to said first gear and said second gear so as to cause said first gear and said second gear to rotate about said pedal shaft in directions opposite each other.

11. A bicycle as in claim 10 wherein said first gear, said second gear and said third gear are bevel gears.

12. A bicycle as in claim 10 wherein said first gear, said second gear and said third gear are spur gears.

13. A bicycle as in claim 10 wherein said gearing means further comprises a pedal sprocket driving said drive chain, said pedal sprocket being configured to rotate about said pedal shaft.

14. A bicycle as in claim 13 wherein said first gear is attached to said pedal sprocket so that said first gear and said pedal sprocket rotate together about said pedal shaft.

15. A bicycle as in claim 14 wherein said first gear is attached to a clutch means so as to permit said first gear to rotate freely in said counterclockwise direction about said pedal shaft but rotate with and be driven by said pedal shaft in said clockwise direction.

16. A bicycle as in claim 15 wherein said second gear is attached to a clutch means so as to permit said second gear to rotate freely in said clockwise direction about said pedal shaft but rotate with and be driven by said pedal shaft in said counterclockwise direction.

17. In a pedal driven vehicle such as a bicycle, a pedal shaft having an axis;

pedal arms mounted on said pedal shaft to drive said pedal shaft in a clockwise or counterclockwise direction;

pedals mounted on each one of said pedal arms;

a drive chain; and driving means to impart a forward force to said vehicle by rotation of said drive chain in one direction when said pedal shaft is driven in said clockwise direction and to impart a forward force to said vehicle by rotation of said drive chain in said one direction when said pedal shaft is driven in said counterclockwise direction.

18. A pedal driven vehicle according to claim 17, wherein said first gear and said second gears are mounted on said pedal shaft to rotate about said axis.

19. A pedal driven vehicle according to claim 18, further comprising gearing means to couple said first gear and said second gear to each other such that said first gear and said second gear rotate about said axis in opposite directions.

20. A pedal driven vehicle according to claim 19, wherein said gears and said gearing means are bevel gears.

21. A pedal driven vehicle according to claim 19, wherein said gears and said gearing means are spur gears.

22. A pedal driven vehicle according to claim 19, wherein said driving means further comprises a pedal sprocket mounted on said pedal shift to rotate about said axis.

23. A pedal driven vehicle according to claim 22, wherein said first gear is attached to said pedal sprocket so that said first gear and said pedal sprocket rotate together about said axis.

24. A pedal driven vehicle according to claim 23, wherein said driving means further comprises means to drive said vehicle forward in response to rotation of said pedal sprocket in said clockwise direction.

25. A pedal driven vehicle according to claim 19, further comprising clutch means to mount said first gear on said pedal shaft so as to permit said first gear to rotate freely in said counterclockwise direction about said pedal shaft and to rotate with and be driven by said pedal shaft in said clockwise direction while applying a driving force to said vehicle.

26. A pedal driven vehicle according to claim 25, further comprising clutch means to mount said second gear on said pedal shaft so as to permit said second gear to rotate freely in said clockwise direction about said pedal shaft and to rotate with and be driven by said pedal shaft in said counterclockwise direction while applying a driving force to said vehicle.

27. A pedal mechanism according to claim 26, wherein said driving means further comprises a pedal sprocket mounted to rotate freely on said pedal shaft and means fixing said first gear to said pedal sprocket so that said first gear and said pedal sprocket rotate together on said pedal shaft.

28. A pedal mechanism for driving a vehicle, such as a bicycle, comprising:

a pedal shaft;

a left pedal arm having a first end and a second end, said first end of said left pedal arm being mounted on said pedal shaft;

a right pedal arm having a first end and a second end, said first end of said right pedal arm being mounted on said pedal shaft;

a left pedal mounted on said second end of said left pedal arm;

a right pedal mounted on said second end of said right pedal arm;

a first gear;

a first freewheeling clutch mounting said first gear on said pedal shaft permitting said first gear to rotate freely on said pedal shaft in a counterclockwise direction and to rotate with and be driven by said pedal shaft in a clockwise direction;

a second gear;

a second freewheeling clutch mounting said second gear on said pedal shaft permitting said second gear to rotate freely on said pedal shaft in said clockwise direction and to rotate with and be driven by said pedal shaft in said counterclockwise direction; and a third gear coupled to said first gear and said second gear to cause said first gear and said second gear to rotate in opposite directions on said pedal shaft.

\* \* \* \* \*

UNITED STATES PATENT AND TRADEMARK OFFICE
CERTIFICATE OF CORRECTION

PATENT NO. : 5,551,718
DATED : September 3, 1996
INVENTOR(S) : Salvatore Toronto; Paul Novak It is certified that error appears in the above-indentified patent and that said Letters Patent is hereby corrected as shown below:

Column 2, line 40, before 29, insert "adapter".

Column 7, line 5, change "shift" to "shaft".

Signed and Sealed this

Nineteenth Day of November, 1996

Attest:

BRUCE LEHMAN

Attesting Officer     Commissioner of Patents and Trademarks